United States Patent [19]

Feraday

[11] 4,020,131

[45] Apr. 26, 1977

[54] PREPARATION OF MIXED OXIDE NUCLEAR FUEL

[75] Inventor: Melville A. Feraday, Deep River, Canada

[73] Assignee: Atomic Energy of Canada Limited, Ottawa, Canada

[22] Filed: Dec. 1, 1975

[21] Appl. No.: 636,678

[30] Foreign Application Priority Data

Feb. 28, 1975 Canada .................................. 221017

[52] U.S. Cl. .............................. 264/.5; 252/301.1 R
[51] Int. Cl.² ........................................ G21C 21/00
[58] Field of Search ................ 264/.5; 252/301.1 R, 252/301.15

[56] References Cited

UNITED STATES PATENTS

| | | |
|---|---|---|
| 3,320,178 | 5/1967 | Dewell .................... 252/301.1 S |
| 3,327,027 | 6/1967 | St. Pierre ..................... 264/.5 |
| 3,408,304 | 10/1968 | Kosiancic ..................... 264/.5 X |
| 3,531,416 | 9/1970 | Akutsu et al. ................. 264/.5 X |
| 3,728,274 | 4/1973 | Gerontopoulos et al. ......... 264/.5 X |
| 3,789,013 | 1/1974 | Triggiani et al. ............... 264/.5 X |
| 3,799,882 | 3/1974 | Holland ....................... 264/.5 X |
| 3,806,565 | 4/1974 | Langrod ........................ 264/.5 |

*Primary Examiner*—Peter A. Nelson
*Attorney, Agent, or Firm*—James R. Hughes

[57] ABSTRACT

A method of making mixed oxide especially $UO_2$-$PuO_2$ nuclear fuel by impregnation wherein the green pellets of nuclear fuel oxide are partially sintered, then impregnated with a second nuclear fuel oxide, and then given a final and complete sintering step.

4 Claims, No Drawings

PREPARATION OF MIXED OXIDE NUCLEAR FUEL

This invention relates to a method of making mixed oxide especially $UO_2$—$PuO_2$ nuclear fuel by impregnation and to fuel produced by the method.

Canadian Pat. No. 872,722, issued June 8, 1971 to John Pawliw discloses a method of preparing mixed oxide nuclear fuel. This patent describes as an example the making of $UO_2$—$PuO_2$ pellets by impregnating either the substantially completed basic pellet (after complete sintering) or the green pellet (before any sintering has been carried out). Impregnating green pellets of $UO_2$ with a plutonium salt has disadvantages because subsequent handling can be a problem and the impregnated pellet has to be ground in a glove box after sintering. Also if the $PuO_2$ only penetrates a few mm. into the pellet, it will result in the removal by grinding of a large proportion of highly enriching material and this is uneconomic.

Impregnating the substantially completed basic fuel pellet of the type used in current CANDU nuclear reactor designs with sufficient $PuO_2$ is virtually impossible because of the small amount of open porosity (<1%) in these pellets. It is possible to make pellets with more open porosity by using a less reactive powder however the final sintered density is reduced considerably and further sintering may occur in-reactor to cause element instability.

It is an object of the present invention to provide a method of producing mixed oxide especially $UO_2$—$PuO_2$ nuclear fuel pellets by an impregnation method that is more economic and that requires a minimum of processing of highly toxic or radioactive material in glove boxes or other protected and shilded environments.

This and the objects of the invention are achieved by a fabrication method wherein the green pellets of nuclear fuel oxide are partially sintered, then impregnated with a second nuclear fuel oxide, and then given a final and complete sintering step.

The complete system comprises the following: green pellets of the basic fuel material (e.g. $UO_2$) are fabricated by standard powder metallurgy techniques. These are partially sintered at a relatively low temperature (1100 to 1400° C) to bring the density of the pellets to 75–93% theoretical density and then ground or machined to a size which will sinter to the final required size. After the grinding washing, and drying the pellets are impregnated with the second fuel oxide material (e.g. $PuO_2$). This is achieved by impregnating the pellets with a plutonium salt solution (preferably plutonium nitrate). It is important that some of the porosity be interconnected and distributed uniformly across the pellet otherwise the impregnation will not be effective. The pellet are then given a final and complete sintering step in the temperature range 1400° to 1700° C in which the plutonium is converted to $PuO_2$ and the pellet densified to a much higher density.

The depth of penetration of the impregnating salt, the percentage of the pellet enriched and the distribution and concentration of the enriching material can be varied to give beneficial effects for heat transfer and reactor physics by various techniques. Several examples are listed:

a. a larger percentage of the pellet can be enriched by sintering at a lower temperature to increase open porosity, by reducing the length to diameter ratio of the pellet or by having a central void in the pellet b. the concentration of enrichment can be increased by multiple impregnation or higher concentration of enriching material in the solution c. the distribution of enrichment in the pellet can be controlled e.g. eleminated from the ends by using suitable porosity and sealing the ends of the pellets during impregnation.

The second step of sintering (at high temperature) should be effective in sealing up the porosity in the impregnated pellet as well as converting the plutonium salt to the oxide and giving high density pellets with suitable dimensional tolerances. If plutonium loss during the second stage of sintering is too high, a lower temperature may be used.

The two step sintering process described above has certain advantages. Most of the fuel is produced using the normal process route outside the plutonium process line. No grinding of pellets or handling of powder is required inside the plutonium process line. This makes for a cheaper and less dangerous overall process. The distribution of plutonium can be homogeneous throughout the uranium in the pellets, or it can be distributed in selected areas. The Pu is contained in sealed pores after the second sintering stage.

This process can be applied equally well to mixed oxide fuel rods or pellets produced in other ways e.g. by extrusion. In this example the extruded fuel (e.g. $UO_2$) is partially sintered, ground to size and then impregnated with the enriching material e.g. plutonium nitrate. The rods or pellets are then sintered to full density.

Some experimental work has been done using material enrichment $UO_2$ pellets impregnated with enriched uranium instead of plutonium. The depth of penetration and distribution of enrichment was then checked using neutron radiography. For example a 12 mm diameter by 12 mm long $UO_2$ pellet was sintered to 88% density and impregnated. The enriching material penetrated about 2 mm into the pellet enriching over 50% of the pellet volume. Using only impregnation an average pellet enrichment of 0.4 wt % was achieved without difficulty.

In the above description of the method, the fuel materials used are shown as uranium oxide enriched with plutonium oxide. The method can apply to other nuclear fuel materials. The pellets (which also may be in the form of extruded rods) can be thorium oxide as well as uranium oxide and the enriching material can be plutonium, uranium −233 or −235.

I claim:

1. A method of making enriched mixed oxide nuclear fuel comprising:
   a. sintering green oxide fuel pellets of a first nuclear fuel material in a first stage of sintering until the pellets have a 3–25% open porosity, said sintering being carried out at a temperature in the range 1100° to 1400° C,
   b. grinding off the outer surface layer of the pellets,
   c. impregnating the pellets with a salt of a second nuclear fuel material in solution, and
   d. subjecting the impregnated pellets to a second stage of sintering in the temperature range 1500° to 1700° C to convert the salt of the second nuclear material to oxide of the material.

2. A method as in claim 1 wherein the fuel pellets are made of a first nuclear fuel material selected from the group consisting of uranium oxide and thorium oxide.

3. A method of making enriched mixed oxide nuclear fuel as in claim 1 wherein the said salt is nitrate.

4. A method of making enriched mixed oxide nuclear fuel as in claim 1 wherein the said second nuclear fuel material is selected from the group consisting of plutonium, uranium −233, and uranium−235.

* * * * *